US010783268B2

(12) United States Patent
Kafai et al.

(10) Patent No.: US 10,783,268 B2
(45) Date of Patent: Sep. 22, 2020

(54) DATA ALLOCATION BASED ON SECURE INFORMATION RETRIEVAL (71) Applicant: Hewlett Packard Enterprise Development LP, Houston, TX (US)

(72) Inventors: Mehran Kafai, Redwood City, CA (US); Manav Das, Chicago, IL (US)

(73) Assignee: Hewlett Packard Enterprise Development LP, Houston, TX (US)

(*) Notice: Subject to any disclaimer, the term of this patent is extended or adjusted under 35 U.S.C. 154(b) by 197 days.

(21) Appl. No.: 15/774,708

(22) PCT Filed: Nov. 10, 2015

(86) PCT No.: PCT/US2015/059934
§ 371 (c)(1),
(2) Date: May 9, 2018

(87) PCT Pub. No.: WO2017/082875
PCT Pub. Date: May 18, 2017

(65) Prior Publication Data
US 2018/0322304 A1 Nov. 8, 2018

(51) Int. Cl.
*G06F 21/00* (2013.01)
*G06F 21/62* (2013.01)
(Continued)

(52) U.S. Cl.
CPC ...... *G06F 21/6227* (2013.01); *G06F 16/2455* (2019.01); *G06F 16/24578* (2019.01); *G06F 21/62* (2013.01)

(58) Field of Classification Search
CPC .................... G06F 21/6227; G06F 16/2455
(Continued)

(56) References Cited

U.S. PATENT DOCUMENTS 4,261,043 A 4/1981 Robinson et al.
4,751,742 A 6/1988 Meeker
(Continued)

FOREIGN PATENT DOCUMENTS

EP 1072982 A2 1/2001
EP 1521210 B1 11/2009
(Continued)

OTHER PUBLICATIONS

International Preliminary Report on Patentability received for PCT Patent Application No. PCT/US2015/059934, dated May 24, 2018, 10 pages.
(Continued)

*Primary Examiner* — Anthony D Brown
(74) *Attorney, Agent, or Firm* — Hewlett Packard Enterprise Patent Department (57) ABSTRACT

Data allocation based on secure information retrieval is disclosed. One example is a system including an information processor communicatively linked to a query processor and a plurality of data processors respectively associated with a plurality of datasets. The information processor receives a request from the query processor for identification of a target dataset to be associated with a query term. The information processor generates a random permutation, and receives a secure version of the query term from the query processor, and receives secure versions of a collection of candidate terms from each of a plurality of data processors, each candidate term representing a cluster of similar terms in the associated dataset. The information processor determines similarity scores between the secure version of the query term and secure versions of the candidate terms, and identifies the target dataset of the plurality of datasets based on the determined similarity scores.

20 Claims, 6 Drawing Sheets

(51) Int. Cl.
*G06F 16/2455* (2019.01)
*G06F 16/2457* (2019.01)

(58) Field of Classification Search
USPC .......................................................... 726/28
See application file for complete search history.

(56) References Cited

U.S. PATENT DOCUMENTS

| | | | |
|---|---|---|---|
| 6,263,334 | B1 | 7/2001 | Fayyad et al. |
| 6,374,266 | B1 | 4/2002 | Shnelvar |
| 6,931,408 | B2 | 8/2005 | Adams et al. |
| 7,337,168 | B1 | 2/2008 | Sigel et al. |
| 7,685,083 | B2 | 3/2010 | Fairweather |
| 7,725,444 | B2 | 5/2010 | Devarakonda et al. |
| 7,756,269 | B2 | 7/2010 | Hawkes et al. |
| 8,010,466 | B2 | 8/2011 | Patinkin |
| 8,010,782 | B2 | 8/2011 | Kerschbaum et al. |
| 8,041,706 | B2 | 10/2011 | Agrawal et al. |
| 8,103,824 | B2 | 1/2012 | Pollack et al. |
| 8,165,414 | B1 | 4/2012 | Yagnik |
| 8,234,470 | B2 | 7/2012 | Tevis et al. |
| 8,515,964 | B2 | 8/2013 | Ravikumar et al. |
| 8,630,422 | B2 | 1/2014 | Gentry et al. |
| 8,805,793 | B2 | 8/2014 | Patiejunas et al. |
| 9,448,695 | B2 | 9/2016 | O'Brien-Strain et al. |
| 2002/0026438 | A1 | 2/2002 | Rjaibi et al. |
| 2003/0108242 | A1 | 6/2003 | Conant |
| 2003/0167263 | A1 | 9/2003 | Sasaki et al. |
| 2005/0033523 | A1 | 2/2005 | Abe et al. |
| 2005/0055345 | A1 | 3/2005 | Ripley |
| 2005/0086210 | A1 | 4/2005 | Kita et al. |
| 2006/0095521 | A1 | 5/2006 | Patinkin |
| 2007/0038602 | A1 | 2/2007 | Weyand et al. |
| 2007/0094511 | A1 | 4/2007 | Wilson et al. |
| 2008/0177810 | A1 | 7/2008 | Devarakonda et al. |
| 2008/0183682 | A1 | 7/2008 | Lang et al. |
| 2010/0017487 | A1 | 1/2010 | Patinkin |
| 2010/0035095 | A1 | 2/2010 | Taniguchi et al. |
| 2010/0177842 | A1 | 7/2010 | Chang et al. |
| 2010/0325095 | A1 | 12/2010 | Stephenson et al. |
| 2010/0325133 | A1 | 12/2010 | Rounthwaite et al. |
| 2011/0040820 | A1 | 2/2011 | Rane et al. |
| 2011/0145593 | A1 | 6/2011 | Auradkar et al. |
| 2011/0311042 | A1* | 12/2011 | Cheddad ............... G06F 21/602 380/28 |
| 2012/0137375 | A1 | 5/2012 | Ramachandran et al. |
| 2013/0031059 | A1* | 1/2013 | Ravikumar ........... G06F 16/325 707/667 |
| 2013/0097664 | A1 | 4/2013 | Herz et al. |
| 2013/0173917 | A1 | 7/2013 | Clifton et al. |
| 2013/0191329 | A1 | 7/2013 | Dozier et al. |
| 2013/0275752 | A1 | 10/2013 | Zhang et al. |
| 2014/0281578 | A1 | 9/2014 | Bennison |
| 2015/0057948 | A1 | 2/2015 | Reid et al. |
| 2015/0154418 | A1 | 6/2015 | Redberg |
| 2015/0205818 | A1 | 7/2015 | Darcy |
| 2015/0278156 | A1 | 10/2015 | Ambai et al. |
| 2016/0247175 | A1 | 8/2016 | Milton et al. |
| 2016/0283574 | A1 | 9/2016 | Anderson et al. |

FOREIGN PATENT DOCUMENTS

| | | |
|---|---|---|
| EP | 2650798 | 10/2013 |
| WO | WO-2013062941 | 5/2013 |

OTHER PUBLICATIONS

Esmaeili et al., "A Fast Approximate Nearest Neighbor Search Algorithm in the Hamming Space," IEEE Transactions on Pattern Analysis and Machine Intelligence, vol. 34, Issue 12, Dec. 2012, pp. 2481-2488.

Ge et al., "Optimized Product Quantization for Approximate Nearest Neighbor Search," IEEE Conference on Computer Vision and Pattern Recognition (CVPR), Jun. 2013, pp. 2944-2951.

International Search Report and Written Opinion received for PCT Patent Application No. PCT/US2015/028896, dated Jan. 29, 2016, 7 pages.

Shi et al., "Secure Two-Party Multi-Dimensional Vector Comparison Protocol", International Conference on Management and Service Science, 2009.

Sun et al., "A New Hybrid Approach for Privacy Preserving Distributed Data Mining", IEICE Transactions on Information and Systems vol. E97-D, No. 4, Apr. 2014, pp. 876-883.

Wang et al., "Trinary-Projection Trees for Approximate Nearest Neighbor Search," IEEE Transactions on Pattern Analysis and Machine Intelligence, vol. 36, Issue 2, Feb. 2014, pp. 388-403.

Wei et al.,"Projected Residual Vector Quantization for ANN Search" IEEE MultiMedia, vol. 21, Jul.-Sep. 2014, pp. 41-51.

Wen et al., "Secure Multi-Party Comparing Protocol Based on Multi-Threshold Secret Sharing Scheme", 6th International Conference on Wireless Communications Networking and Mobile Computing (WiCOM), 2010.

Alaggan, M.; "Private Peer-to-peer Similarity Computation in Personalized Collaborative Platforms"; May 1-9, 2014; 136 pages.

Aschermann, M, et al., "Similarity-Based Resource Retrieval in Multi-agent Systems by Using Locality-Sensitive Hash Functions," pp. 4-18, 2013 See abstract; section 3, and figure 2.

Beis, J.S. et al, "Shape Indexing Using Approximate Nearest-Neighbor Search in High-Dimensional Spaces", Nov. 9, 2005; 7 pages.

Damgard, I. et al.; "On the Orthogonal Vector Problem and the Feasibility of Unconditionally Secure Leakage Resilient Computation"; dated: Apr. 23, 2014; 28 pages.

He, K. et al, "Computing Nearest-Neighbor Fields via Propagation—Assisted KD-trees", Apr. 5, 2012; 8 pages.

Huang, Y.; "Practical Secure Two-party Computation"; Aug. 2012; 121 pages.

Hwang, Y et al, "A fast Nearest Neighbor Search Algorithm by Nonlinear Embedding", Jun. 13, 2012; 8 pages.

Jiang, W. et al., "A Secure and Distributed Framework to Identify and Share Needed Information," pp. 1224-1230, Oct. 9-11, 2011 See abstract and section III.

Kraschewski, D.; "Complete Primitives for Information-theoretically Secure Two-party Computation"; Jan. 25, 2013; 132 pages.

Kushilevitz, E. et al,; "Efficient Search for Approximate Nearest Neighbot in High Dimensional Spaces", 1998; 18 pages.

Liu, C. et al.; "Automating Efficient RAM-Model Secure Computation"; Mar. 15, 2014; 16 pages.

Nair, D. G. et al., "An Effective Private Data storage and Retrieval System using Secret sharing scheme based on Secure Multi-party Computation," pp. 210-221, Aug. 26-28, 2014; See abstract; section III; and figures 1-2.

Oracle; "Flexible Data Streams"; 2005; Oracle Demand Planning Implementation and User's Guide; 16 pages.

PCT International Search Report issued in PCT/US2015/059934; dated Jul. 28, 2016; 3 page.

PCT; "International Search Report and Written Opinion of the International Searching Authority"; dated Mar. 2, 2015, issued in related PCT Application No. PCT/US2014/047803; 10 pages.

PCT; "Notification of Transmittal of the International Search Report and the Written Opinion of the International Searching Authority, or the Declaration"; cited in PCT/US2014/053333; dated Apr. 29, 2015; 11 pages.

Preneel, B.; "Analysis and Design of Cryptographic Hash Functions"; dated: Feb. 2003: 338 pages.

Sanders, R. E.; "Using the DB2 10.5 Multi-Temperature Data and Administration Feature with EMC Syrnmetrix FAST VP Storage-Tiering"; DBA Society; May 22, 2015; 29 pages.

Wiese, L.; "Horizontal Fragmentation for Data Outsourcing with Formula-Based Confidentiality Constraints,"In: Advances in Information and Computer Security, pp. 101-116, 2010 See abstract and section 4.

* cited by examiner

DATA ALLOCATION BASED ON SECURE INFORMATION RETRIEVAL

BACKGROUND

Data storage products, such as data backup devices, may be used to store data that are similar. Separate storage products may store distinct types of data, while a given storage device may store similar data. In some examples, such storage devices may be secured. Data terms may be allocated to, or retrieved from, such storage devices.

DETAILED DESCRIPTION

Data storage products, especially data backup devices, are often used to store large amounts of similar data. In some instances, human error, or system error outside the backup device, may result in a data item being erroneously copied to a device other than the one for which it was intended. This may result in data loss, and/or accidental exposure of the data item to a third party, potentially with serious legal and/or commercial ramifications.

Data terms may be allocated to, or retrieved from, such storage devices. In some examples, the storage devices may be secured. In some examples, such storage devices may require data to be encrypted before being stored. In some examples, different storage devices may require different encryptions. Error in data storage may lead to inadvertent security loopholes and/or breaches.

In some instances, a first party may desire to securely store information in a plurality of storage devices. Based on a volume of data, such situations may result in an increase in a number of secure computations and inter-party data exchanges. Also, for example, there may be intermediate information processors that may not be secure, and/or may have unreliable data protection mechanisms. In such instances, there is a need to not expose all the data from one or more of the parties. Accordingly, there is a need to compute similarity between data distributed over multiple parties, without exposing all the data from any party, and without a need for secure intermediaries.

Existing systems are generally directed to addressing the need for identifying storage devices with content similar to an incoming data element. However, such systems focus on identifying similarities with the data content after the data element has been stored in a storage device. Accordingly, there is a need to identify an appropriate data storage device prior to storing the incoming data element, while maintaining the anonymity of the data stored in the storage devices and the incoming data element.

As described in various examples herein, data allocation based on secure information retrieval is disclosed. Data allocation based on secure information retrieval is a secure protocol that allows one party to retrieve information from a plurality of second parties without revealing the data that supports the information. One example is a system including an information processor communicatively linked to a query processor and a plurality of data processors respectively associated with a plurality of datasets. The information processor receives a request from the query processor for identification of a target dataset to be associated with a query term. The information processor generates a random permutation, and receives a secure version of the query term from the query processor, and receives secure versions of a collection of candidate terms from each of a plurality of data processors, each candidate term representing a cluster of similar terms in the associated dataset. The information processor determines similarity scores between the secure version of the query term and secure versions of the candidate terms, and identifies the target dataset of the plurality of datasets based on the determined similarity scores.

In the following detailed description, reference is made to the accompanying drawings which form a part hereof, and in which is shown by way of illustration specific examples in which the disclosure may be practiced. It is to be understood that other examples may be utilized, and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

Figure 1:
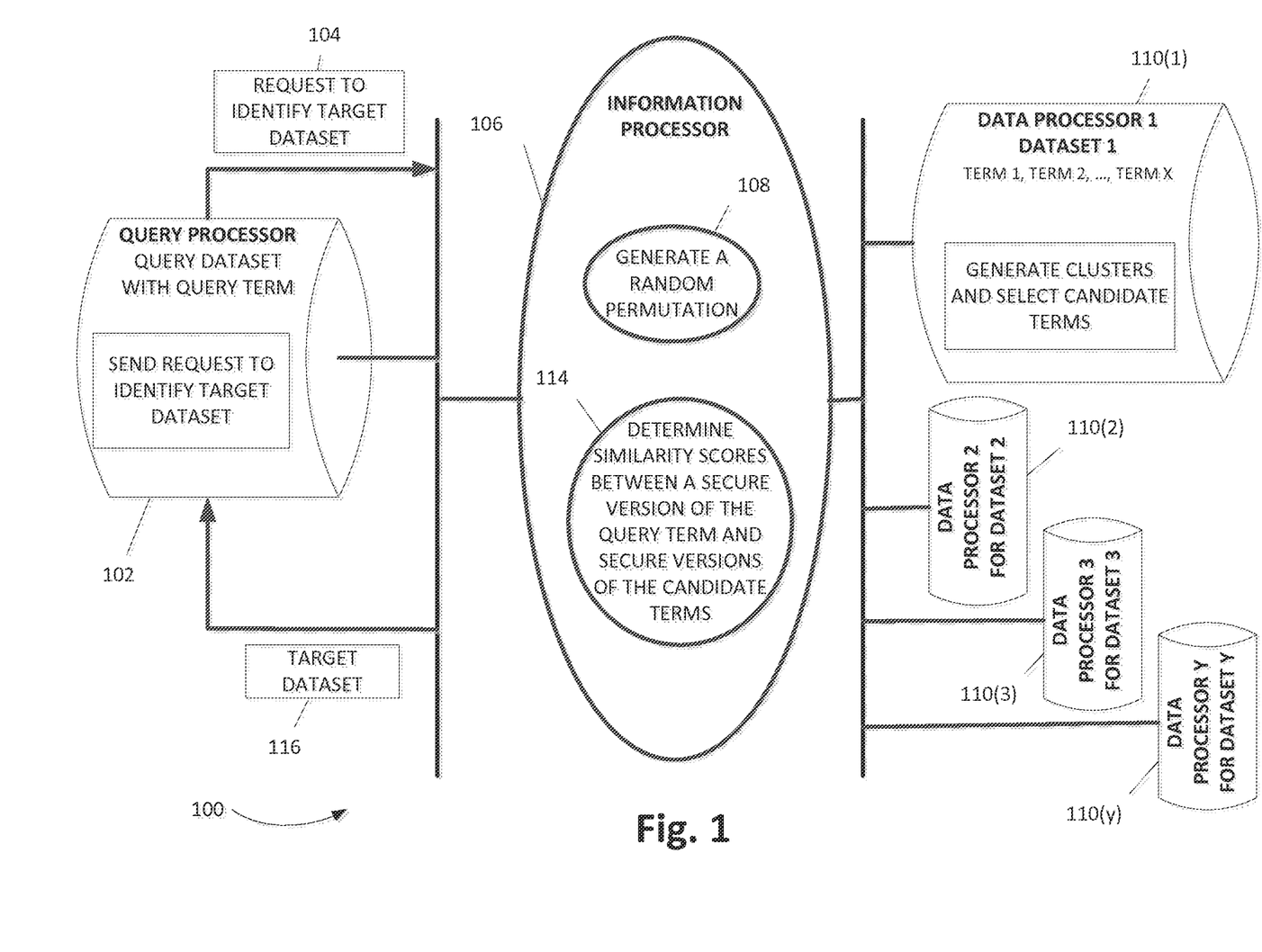
FIG. 1 is a functional block diagram illustrating one example of a system for data allocation based on secure information retrieval.

FIG. 1 is a functional block diagram illustrating one example of a system 100 for system for data allocation based on secure information retrieval. System 100 is shown to include an information processor 106 communicatively linked to a query processor 102 and a plurality of data processors (e.g., Data Processor 1 110(1), Data Processor 2 110(2), Data Processor Y 110(y)), respectively associated with a plurality of datasets or data containers, $B_1, B_2, \ldots, B_n$ (not shown). The query processor 102, the information processor 106, and the plurality of data processors, Data Processor 1 110(1), Data Processor 2 110(2), . . . , Data Processor Y 110(y)), are communicatively linked to one another via a network.

The term "system" may be used to refer to a single computing device or multiple computing devices that communicate with each other (e.g. via a network) and operate together to provide a unified service. In some examples, the components of system 100 may communicate with one another over a network. As described herein, the network may be any wired or wireless network, and may include any number of hubs, routers, switches, cell towers, and so forth. Such a network may be, for example, part of a cellular network, part of the internet, part of an intranet, and/or any other type of network. In some examples, the network may be a secured network.

In some examples, the datasets $B_1, B_2, \ldots, B_n$ may include collections of data terms that may be represented as d-dimensional real-valued vectors. A query dataset associated with the query processor 102 may include a query term that it may want to move/copy to one of the plurality of datasets. The goal of the secure storage container allocation process described herein is to minimize information leakage while transferring the query term from the query dataset to a target dataset 116, where the target dataset 116 has a subset of data terms that have high similarity to the query term. Generally, the datasets $B_1, B_2, \ldots, B_n$ may not want to share their information with other parties in the system 100.

To facilitate the secure storage container allocation process between all parties, a single intermediary processing node may be utilized, such as the information processor 106. For the purposes of this description, the information processor 106 may be assumed to be a semi-honest node, i.e., the information processor 106 follows the protocol as described herein; however, in some instances, it may utilize the messages that it receives to extract more information about the data terms. The query processor 102 sends a request 104 to the information processor 106. The request includes two parameters, a hash length U, and a hash number H indicative of a number of hashes per data term. The integer H may be experimentally determined based on the type and number of data terms in the incoming data stream 102. Generally, U is a very large integer relative to H. In one example, U is a power of 2. The information processor 106 receives, from the query processor 102, the request 104 for identification of a target dataset 116 to be associated with the query term. In some examples, the query term may be an N-dimensional vector with numerical, real-valued components. The term "identification" as used herein, generally refers to identifying a target dataset that may be a suitable destination for the query term. For example, identification may mean identifying a dataset that includes terms that are most similar to the query term. The term "similar" may be used broadly to include any type of similarity for data terms.

As described herein, in some examples, system 100 may be provided with values for hash count H and hash universe size U. Generally, U is a very large integer relative to H and N. In some examples, U is a power of 2. In some examples, each 6000-dimensional vector (N=6000) may be associated with 100 integers (H=100) selected from the set $\{1, 2, 3, \ldots, 2^{18}\}$ ($U=2^{18}$). Accordingly, the hash transform may transform a higher dimensional data term (e.g. with 6000 dimensions) into a lower dimensional transformed data term (e.g. with 100 dimensions). The information processor 106 generates a random permutation based on the hash length U, and sends the permutation to the query processor 102 and the plurality of data processors (e.g., Data Processor 1 110(1), Data Processor 2 110(2), ..., Data Processor Y 110(y)). Each of the plurality of data processors also receives the hash number H.

The query processor 102 and the plurality of data processors (e.g., Data Processor 1 110(1), Data Processor 2 110(2), ..., Data Processor Y 110(y)) respectively apply a predetermined orthogonal transform to the query term and the data terms in the respective datasets, and select the top hashes. For example, the transformation of the query term and the plurality of terms may be based on the hash number H. In some examples, the hash transform may be an orthogonal transformation. The term "orthogonal transformation" as used herein generally refers to a linear transformation between two linear spaces that preserves their respective linear structure (e.g., preserves an inner product). In some examples, the hash transform may be a Walsh-Hadamard transformation ("WHT"). In some examples, hash transform may be the WHT applied to the query term and the plurality of terms to provide coefficients of the WHT. A WHT is an orthogonal, non-sinusoidal transform that takes a signal as input and outputs a set of basis functions. The output functions are known as Walsh functions. A Walsh function takes two values: +1 and −1.

Generally, performing an orthogonal transform on a data term provides a set of coefficients associated with the data term. For example, after application of the WHT to the data term, the information processor 106 may provide a collection of coefficients $c_1, c_2, \ldots, c_k$. Alternative forms of orthogonal transforms may be utilized as well. For example, a cosine transform may be utilized. In some examples, the largest H coefficients (based on the hash number) of the WHT may comprise a transformed query term and a plurality of transformed data terms.

In some examples, the H largest coefficients, $c_{n_1}, c_{n_2}, \ldots, c_{n_H}$ may be selected as the subset of hashes associated with a data term, say A. Table 1 illustrates an example association of data terms A, B, and C, with sets of hashes:

TABLE 1

| Data Term | Set of Hashes |
| --- | --- |
| A | {1, 5, 9, 13, 16} |
| B | {2, 3, 4, 7, 13} |
| C | {1, 5, 7, 8, 11} |

In some examples, the information processor 106 may determine an index of hash positions based on the orthogonal transform. Table 2 illustrates an example index of hash positions for data terms with $U=2^4$ key positions {1, 2, 16} with data terms A, B, and C, based on sets of H=5 hashes in Table 1:

TABLE 2

| 1 | 2 | 3 | 4 | 5 | 6 | 7 | 8 | 9 | 10 | 11 | 12 | 13 | 14 | 15 | 16 |
| --- | --- | --- | --- | --- | --- | --- | --- | --- | --- | --- | --- | --- | --- | --- | --- |
| A |   |   |   | A |   |   |   | A |   |   |   | A |   |   | A |
|   | B | B | B |   |   | B |   |   |   |   |   | B |   |   |   |
| C |   |   |   | C |   | C | C |   |   | C |   |   |   |   |   |

As illustrated, positions 1 and 5 are indicative of data terms A and C since these data terms have hashes at the hash positions 1 and 5, as illustrated in Table 1. Likewise, position 13 is indicative of data terms A and B since these data terms have hashes at the hash position 13, as illustrated in Table 1.

In some examples, as described herein, the query term and the plurality of terms in the datasets may be transformed based on the random permutation. For example, the transformation may comprise an extension of a numerical vector by concatenating it with itself to generate a vector of length U. In some examples, the permutation may be utilized to generate a transformed query term. For example, the query term (e.g. a numerical vector) may be extended, and the permutation may be applied to the extended vector, and then the orthogonal transform may be applied to generate a transformed query term. Accordingly, the result is an H-dimensional feature vector that represents a secure version of the query term. Secure versions of other data terms may be generated in like manner in the respective datasets. The term "secure version" as used herein, generally refers to a transformed version of a data term (e.g., the transformed query term as described herein) that includes hashes that encode significant information about the data term. Such a transformed version is secure because it is generally difficult to identify the components of the original data term from the hashed version. At the same time, the secure version offers an easy way to compare data terms for significant overlaps that are indicative of a high degree of similarity, without compromising the contents of the individual data terms.

In some examples, the plurality of data processors (e.g., Data Processor 1 110(1), Data Processor 2 110(2), . . . , Data Processor Y 110(y)) generate clusters of a plurality of terms in a dataset associated with a respective data processor, the clusters being based on similarity scores for pairs of terms, and the data processor selects a candidate term from each cluster. For example, Data Processor 1 110(1) may be associated with a Dataset 1 including a plurality of terms (e.g., term 1, term 2, . . . , term X), and may generate clusters of the plurality of terms (e.g., term 1, term 2, . . . , term X).

A similarity score between two data terms may be determined based on a number of common hashes. This provides an approximate measure of similar data terms. The similarity score may be based on a number of overlaps between respective sets of hashes, and is indicative of proximity of the pair of data terms. Table 3 illustrates an example determination of similarity scores for pairs formed from the data terms A, B, and C:

TABLE 3

| Data term Pair: (X, Y) | Similarity score: S(X, Y) |
|---|---|
| (A, B) | S(A, B) = 1 |
| (A, C) | S(A, C) = 2 |
| (B, C) | S(B, C) = 1 |

As illustrated in Table 2, the data terms A and B have position 13 in common in their respective sets of hashes. Accordingly, the similarity score for the pair (A,B), denoted as S(A,B) may be determined to be 1. Also, for example, as illustrated in Table 2, the data terms A and C have positions 1 and 5 in common in their respective sets of hashes. Accordingly, the similarity score for the pair (A,C), denoted as S(A,C) may be determined to be 2. As another example, as illustrated in Table 2, the data terms B and C have position 7 in common in their respective sets of hashes. Accordingly, the similarity score for the pair (B,C), denoted as S(B,C) may be determined to be 1.

A dataset may be partitioned into, say G clusters by grouping similar data terms together, where similar data terms are based on similarity scores. In some examples, a partitioning around k-medoids ("PAM") algorithm may be utilized to obtain G candidate terms from the G clusters, the candidate terms denoted as $r_1, r_2, \ldots, r_G$, where $1 \leq G \leq X$. In some examples, G may be chosen based on heuristics, for example, G=2V.

The information processor 106 receives, from the query processor 102, the secure version of the query term, where the secure version is based on the hash number and the permutation, as described herein. Likewise, the information processor 106 receives, from each of the plurality of data processors (e.g., Data Processor 1 110(1), Data Processor 2 110(2), . . . , Data Processor Y 110(y)), secure versions of a collection of candidate terms, where each candidate term represents a cluster of similar terms in the associated dataset, and where the secure versions are based on the hash number and the permutation.

As described herein, the information processor 106 determines similarity scores between the secure version of the query term and the secure versions of the candidate terms, where the similarity score is indicative of proximity of the secure versions of the candidate terms to the secure version of the query term, and based on shared data elements between the secure version of the query term and the secure versions of the candidate terms. In some examples, the secure version of the query term and each secure candidate term may be of same length, and the similarity score may be a ratio of a number of shared data elements between the secure version of the query term and a secure candidate term to that length.

The information processor 106 identifies the target dataset 116 of the plurality of datasets based on the determined similarity scores. In some examples, the information processor 106 selects, for each of the plurality of data processors (e.g., Data Processor 1 110(1), Data Processor 2 110(2), . . . , Data Processor Y 110(y)), a representative term of the collection of candidate terms. For example, the information processor 106 may compute the similarity between the secure version of the query term and the secure versions of the candidate terms received from all the data processors by measuring overlaps of the hashes. The information processor 106 may then determine, for each data processor, the top candidate term defined as the candidate term with the highest similarity to the query term, and select this top candidate term as the representative term for the data processor. In some examples, more than one representative term may be selected for a data processor. Thereafter, the information processor 106 provides, to each of the plurality of data processors, the respective representative terms.

In some examples, each data processor may approximate the similarity between the secure version of the query term and the data terms from the cluster represented by the representative term determined by the information processor 106. Each data processor then computes a comparative statistic of all the approximated similarity scores between the query term and the terms in the cluster associated with the representative term. The term "comparative statistic" as used herein may be any statistical representation that captures a summary of the data (e.g., approximated similarity scores). In some examples, the comparative statistic may be one of a mean, median, or mode of the approximated similarity scores. In some examples, each data processor provides the comparative statistic between the representative term and its cluster of similar terms, to the information processor 106. The information processor 106 identifies the target dataset 116 based on the comparing. For example, the information processor 106 may identify a dataset with the highest statistic.

In some examples, the data processor may determine the comparative statistic between the secure version of the query term and the secure data terms in the cluster associated with the representative term without knowledge of the query term, where the determination is based on the similarity scores (determined at the information processor 106) between the secure version of the query term and the secure version of the representative term. The main idea behind the selection of the target dataset 116 is to estimate the similarity between the secure version of the query term and all secure terms in the data processor, Data Processor 1 110(1), in the cluster associated with the representative term by only knowing the similarity score between the secure version of the query term and the secure version of the representative term from the data processor, Data Processor 1 110(1).

Accordingly, in the secure information retrieval described herein, the data processors each share a secure version of the representative term with the information processor 106, and the query processor 102 only shares a secure version of the query term with the information processor 106. Accordingly, the information processor 106 is not privy to the actual composition of the query term in the query processor 102, and the plurality of terms in the dataset associated with a data processor, say Data Processor 1 110(1). Also, for example, the query processor 102 has no knowledge of the actual composition of the plurality of terms in the dataset associated with a data processor, say Data Processor 1 110(1). Likewise, the dataset associated with a data processor, say Data Processor 1 110(1), has no knowledge of the actual composition of the query term in the query processor 102. The information processor 106 computes similarity scores between the secure version of the query term and the secure versions of the representative terms, and provides the determined similarity scores to the data processor. The data processor, in turn, utilizes the comparative distribution techniques disclosed herein, to determine similarity scores between the secure version of the query term and the plurality of secure versions of data terms based on the similarity scores between the secure version of the query term and the secure versions of the representative terms received from the information processor 106.

As described herein, another advantage of such indirect determination of similarity scores is that if the query processor 102 requests an additional target dataset for a second query term, the same secure versions of the representative terms may be utilized again to select the additional target dataset.

In some examples, the information processor 106 provides the query term to the identified target dataset 116. For example, the plurality of datasets may be a respective plurality of secure storage containers, and the query term may be a data term to be stored in a target storage container associated with the target dataset 116. Accordingly, the information processor 106 is able to provide the query term to the data container that has data elements that are most similar to the query term, thereby minimizing errors in data allocation. In some examples, the information processor 106 provides the identity of the target dataset 116 to the query processor 102, which, in turn, sends the query term directly to the identified target dataset 116.

In some examples, the information processor 106 may select a target cluster of the target dataset 116 based on the determined similarity scores, and may associate the query term with the target cluster in the target dataset 116. For example, the target cluster may be the cluster associated with the representative term. In some examples, the target dataset 116 may be a secure storage container, and the information processor 106 may associate the query term with a cluster in the secure storage container. In some examples, the secure storage container selected as the target dataset 116 may comprise partitions for data storage, and the information processor 106 may associate the query term with a partition of the secure storage container.

In some examples, the information processor 106 provides the identity of the target dataset 116 to the query processor 102, which, in turn, sends the query term directly to the identified target dataset 116. In some examples, the information processor 106 provides the identity of the target cluster in the target dataset 116 to the query processor 102, which, in turn, sends the query term directly to the identified target cluster in the target dataset 116.

In some examples the information processor 106 may receive a second query term from the query processor 102. In some examples, the information processor 106 may determine if the second query term is similar to the query term, and upon a determination that the second query term is similar to the query term, provide the second query term to the identified target dataset 116. In some examples, upon a determination that the second query term is not similar to the query term, the information processor 106 may identify a second target dataset, and provide the second query term to the identified second target dataset.

In some examples, the information processor 106 may rank the plurality of datasets based on the determined similarity scores, and/or the comparative statistic. For example, the representative terms may be ranked based on respective similarity scores. Accordingly, the associated datasets may be ranked based on the ranking for the representative terms. In some examples, the comparative statistic may be utilized to rank the plurality of datasets, and the information processor 106 may provide a list of top-k datasets to the query processor 102. The query processor 102 may then prompt the information processor 106 to provide the query term to a sub-plurality of the top-k datasets. In some examples, the information processor 106 may rank the clusters in a given dataset, and may provide the query term to a sub-plurality of the clusters based on the determined ranking.

The components of system 100 may be computing resources, each including a suitable combination of a physical computing device, a virtual computing device, a network, software, a cloud infrastructure, a hybrid cloud infrastructure that may include a first cloud infrastructure and a second cloud infrastructure that is different from the first cloud infrastructure, and so forth. The components of system 100 may be a combination of hardware and programming for performing a designated visualization function. In some instances, each component may include a processor and a memory, while programming code is stored on that memory and executable by a processor to perform a designated visualization function.

For example, the information processor 106 may be a combination of hardware and programming for performing a designated function. For example, the information processor 106 may include programming to receive the query term and the candidate terms, and determine similarity scores for the query term and the candidate terms. The information processor 106 may include hardware to physically store the similarity scores, and processors to physically process the received terms and determined similarity scores. Also, for example, information processor 106 may include software programming to dynamically interact with the other components of system 100.

Generally, the components of system 100 may include programming and/or physical networks to be communicatively linked to other components of system 100. In some instances, the components of system 100 may include a processor and a memory, while programming code is stored and on that memory and executable by a processor to perform designated functions.

Generally, the query processor 102 and the plurality of data processors (e.g., Data Processor 2 110(2), Data Processor 3 110(3), . . . , Data Processor Y 110(y)) may be communicatively linked to computing devices. A computing device, as used herein, may be, for example, a web-based server, a local area network server, a cloud-based server, a notebook computer, a desktop computer, an all-in-one system, a tablet computing device, a mobile phone, an electronic book reader, or any other electronic device suitable for provisioning a computing resource to perform a unified visualization interface. The computing device may include a processor and a computer-readable storage medium.

Figure 2:
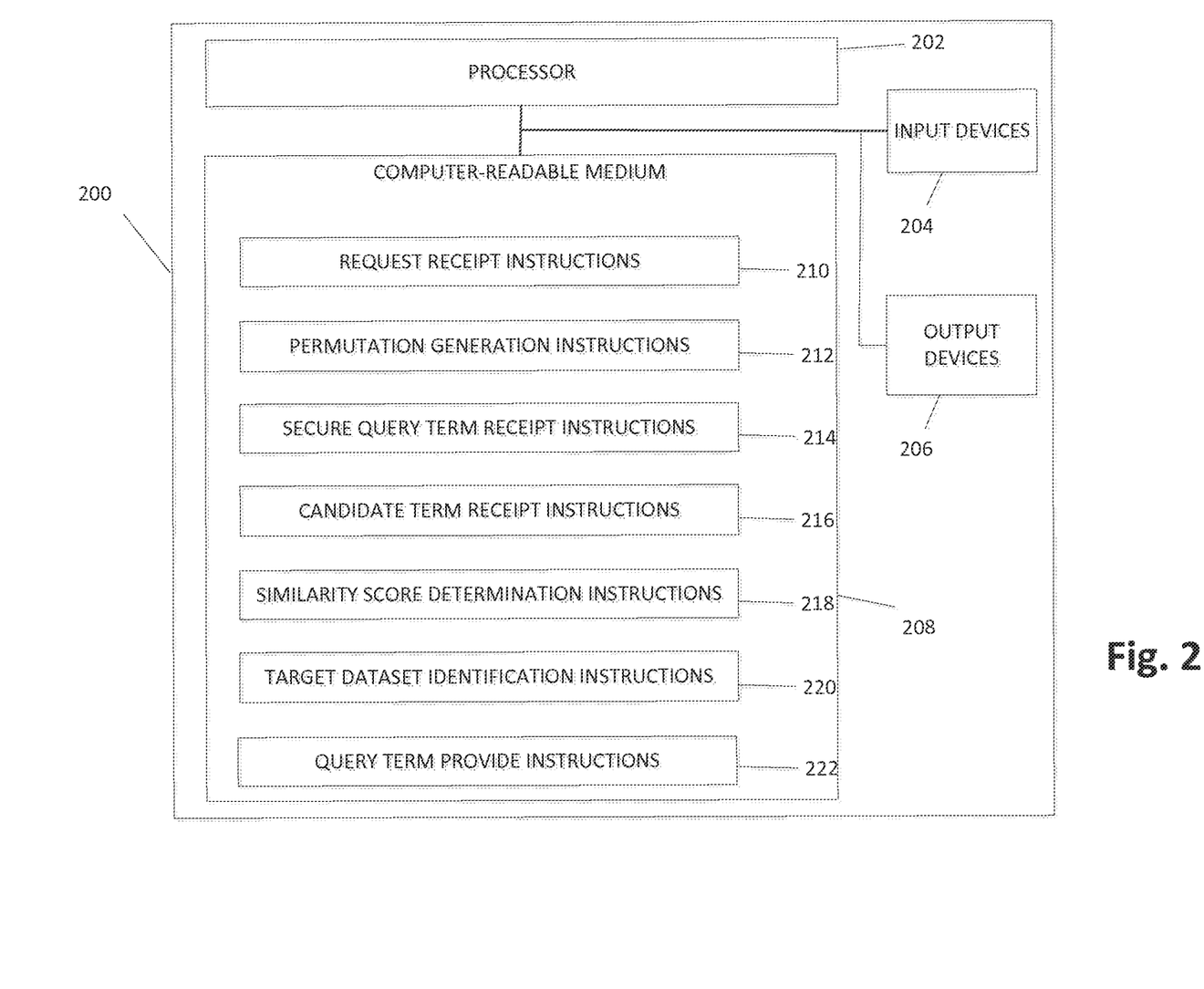
FIG. 2 is a block diagram illustrating one example of a computer readable medium for data allocation based on secure information retrieval.

FIG. 2 is a block diagram illustrating one example of a computer readable medium for data allocation based on secure information retrieval. Processing system 200 includes a processor 202, a computer readable medium 208, input devices 204, and output devices 206. Processor 202, computer readable medium 208, input devices 204, and output devices 206 are coupled to each other through a communication link (e.g., a bus).

Processor 202 executes instructions included in the computer readable medium 208. Computer readable medium 208 includes request receipt instructions 210 to receive, from a query processor, a request for identification of a target dataset to be associated with a query term, the request including a hash length and a hash number.

Computer readable medium 208 includes permutation generation instructions 212 to generate a random permutation based on the hash length.

Computer readable medium 208 includes secure version of the query term receipt instructions 214 to receive, from the query processor, a secure version of the query term, the secure version based on the hash number and the permutation.

Computer readable medium 208 includes candidate term receipt instructions 216 to receive, from each of the plurality of data processors associated with a plurality of datasets, secure versions of a collection of candidate terms, where each candidate term represents a cluster of similar terms in the associated dataset, and where the secure versions are based on the hash number and the permutation.

Computer readable medium 208 includes similarity score determination instructions 218 to determine similarity scores between the secure version of the query term and secure versions of the candidate terms.

Computer readable medium 208 includes target dataset identification instructions 220 to identify the target dataset of the plurality of datasets based on the determined similarity scores.

Computer readable medium 208 includes query term provide instructions 222 to provide the query term to the identified target dataset.

Input devices 204 include a keyboard, mouse, data ports, and/or other suitable devices for inputting information into processing system 200. In some examples, input devices 204, such as a computing device, are used by the interaction processor to receive a query term. Output devices 206 include a monitor, speakers, data ports, and/or other suitable devices for outputting information from processing system 200. In some examples, output devices 206 are used to provide the query term to the target dataset.

As used herein, a "computer readable medium" may be any electronic, magnetic, optical, or other physical storage apparatus to contain or store information such as executable instructions, data, and the like. For example, any computer readable storage medium described herein may be any of Random Access Memory (RAM), volatile memory, non-volatile memory, flash memory, a storage drive (e.g., a hard drive), a solid state drive, and the like, or a combination thereof. For example, the computer readable medium 208 can include one of or multiple different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices.

As described herein, various components of the processing system 200 are identified and refer to a combination of hardware and programming configured to perform a designated visualization function. As illustrated in FIG. 2, the programming may be processor executable instructions stored on tangible computer readable medium 208, and the hardware may include Processor 202 for executing those instructions. Thus, computer readable medium 208 may store program instructions that, when executed by Processor 202, implement the various components of the processing system 200.

Such computer readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

Computer readable medium 208 may be any of a number of memory components capable of storing instructions that can be executed by processor 202. Computer readable medium 208 may be non-transitory in the sense that it does not encompass a transitory signal but instead is made up of one or more memory components configured to store the relevant instructions. Computer readable medium 208 may be implemented in a single device or distributed across devices. Likewise, processor 202 represents any number of processors capable of executing instructions stored by computer readable medium 208. Processor 202 may be integrated in a single device or distributed across devices. Further, computer readable medium 208 may be fully or partially integrated in the same device as processor 202 (as illustrated), or it may be separate but accessible to that device and processor 202. In some examples, computer readable medium 208 may be a machine-readable storage medium.

Figure 3:
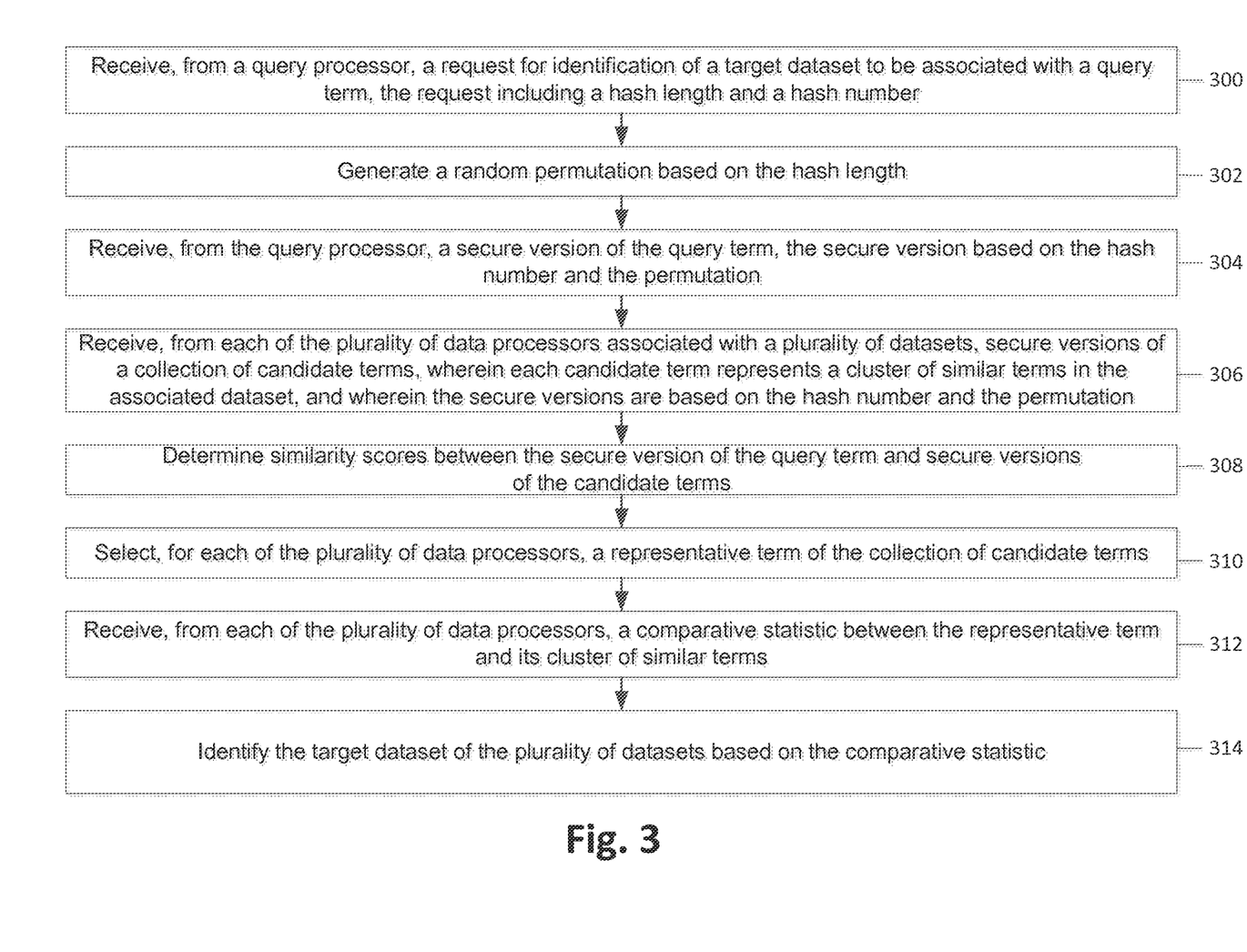
FIG. 3 is a flow diagram illustrating one example of a method for data allocation based on secure information retrieval.

FIG. 3 is a flow diagram illustrating one example of a method for data allocation based on secure information retrieval.

At 300, a request may be received from a query processor, for identification of a target dataset to be associated with a query term, the request including a hash length and a hash number.

At 302, a random permutation may be generated based on the hash length.

At 304, a secure version of the query term may be received from the query processor, the secure version based on the hash number and the permutation.

At 306, secure versions of a collection of candidate terms may be received from each of the plurality of data processors associated with a plurality of datasets, where each candidate term represents a cluster of similar terms in the associated dataset, and where the secure versions are based on the hash number and the permutation.

At 308, similarity scores may be determined between the secure version of the query term and secure versions of the candidate terms.

At 310, a representative term of the collection of candidate terms may be selected for each of the plurality of data processors.

At 312, a comparative statistic between the representative term and its cluster of similar terms may be received from each of the plurality of data processors.

At 314, the target dataset of the plurality of datasets may be identified based on the comparative statistic.

In some examples, the plurality of datasets may be a respective plurality of secure storage containers, and the query term may be a data term to be stored in a target storage container associated with the target dataset.

Figure 4:
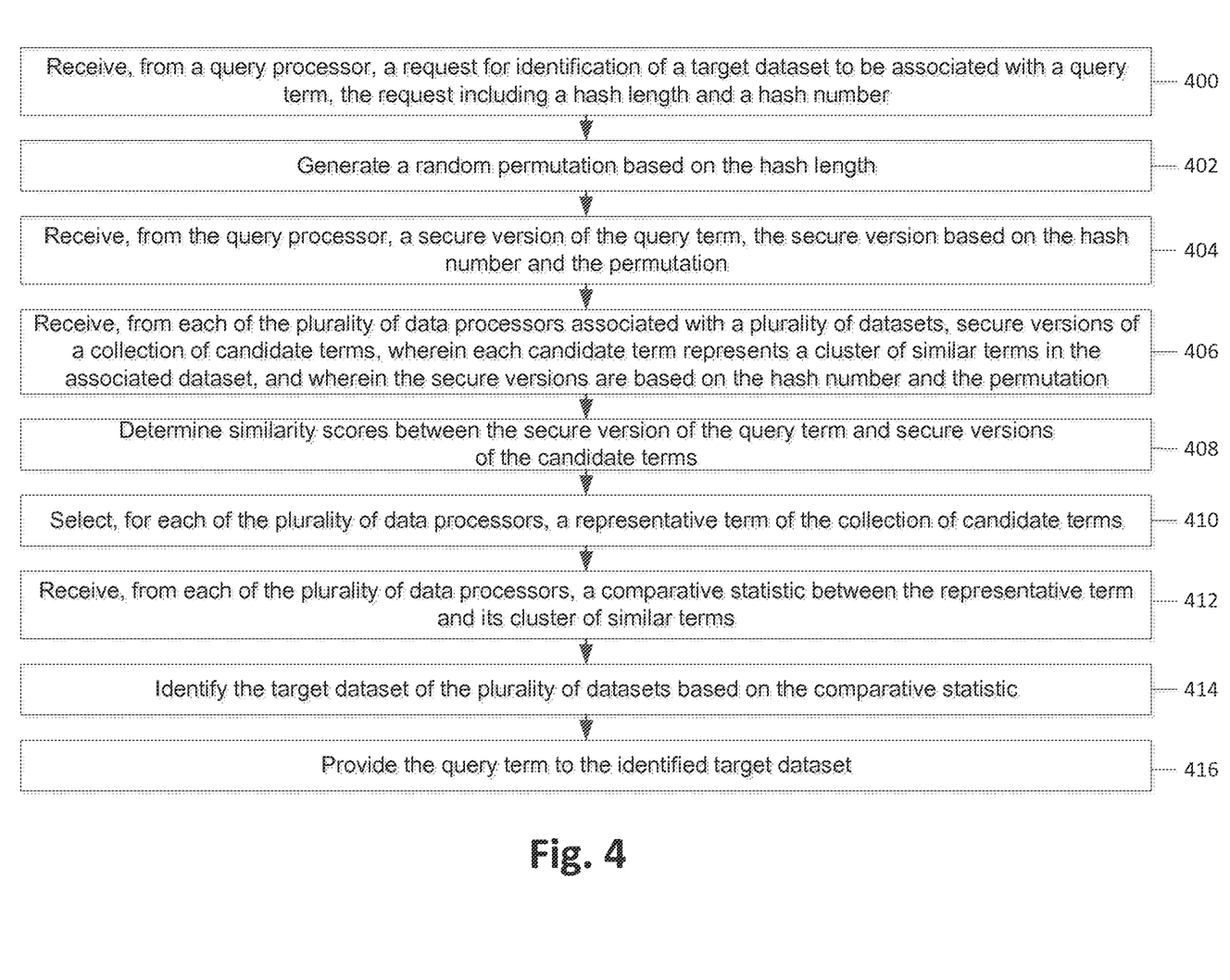
FIG. 4 is a flow diagram illustrating one example of a method for providing a query term to a target dataset in data allocation based on secure information retrieval.

FIG. 4 is a flow diagram illustrating one example of a method for providing a query term to a target dataset in data allocation based on secure information retrieval.

At 400, a request may be received from a query processor, for identification of a target dataset to be associated with a query term, the request including a hash length and a hash number.

At 402, a random permutation may be generated based on the hash length.

At 404, a secure version of the query term may be received from the query processor, the secure version based on the hash number and the permutation.

At 406, secure versions of a collection of candidate terms may be received from each of the plurality of data processors associated with a plurality of datasets, where each candidate term represents a cluster of similar terms in the associated dataset, and where the secure versions are based on the hash number and the permutation.

At 408, similarity scores may be determined between the secure version of the query term and secure versions of the candidate terms.

At 410, a representative term of the collection of candidate terms may be selected for each of the plurality of data processors.

At 412, a comparative statistic between the representative term and its cluster of similar terms may be received from each of the plurality of data processors.

At 414, the target dataset of the plurality of datasets may be identified based on the comparative statistic.

At 416, the query term may be provided to the identified target dataset.

Figure 5:
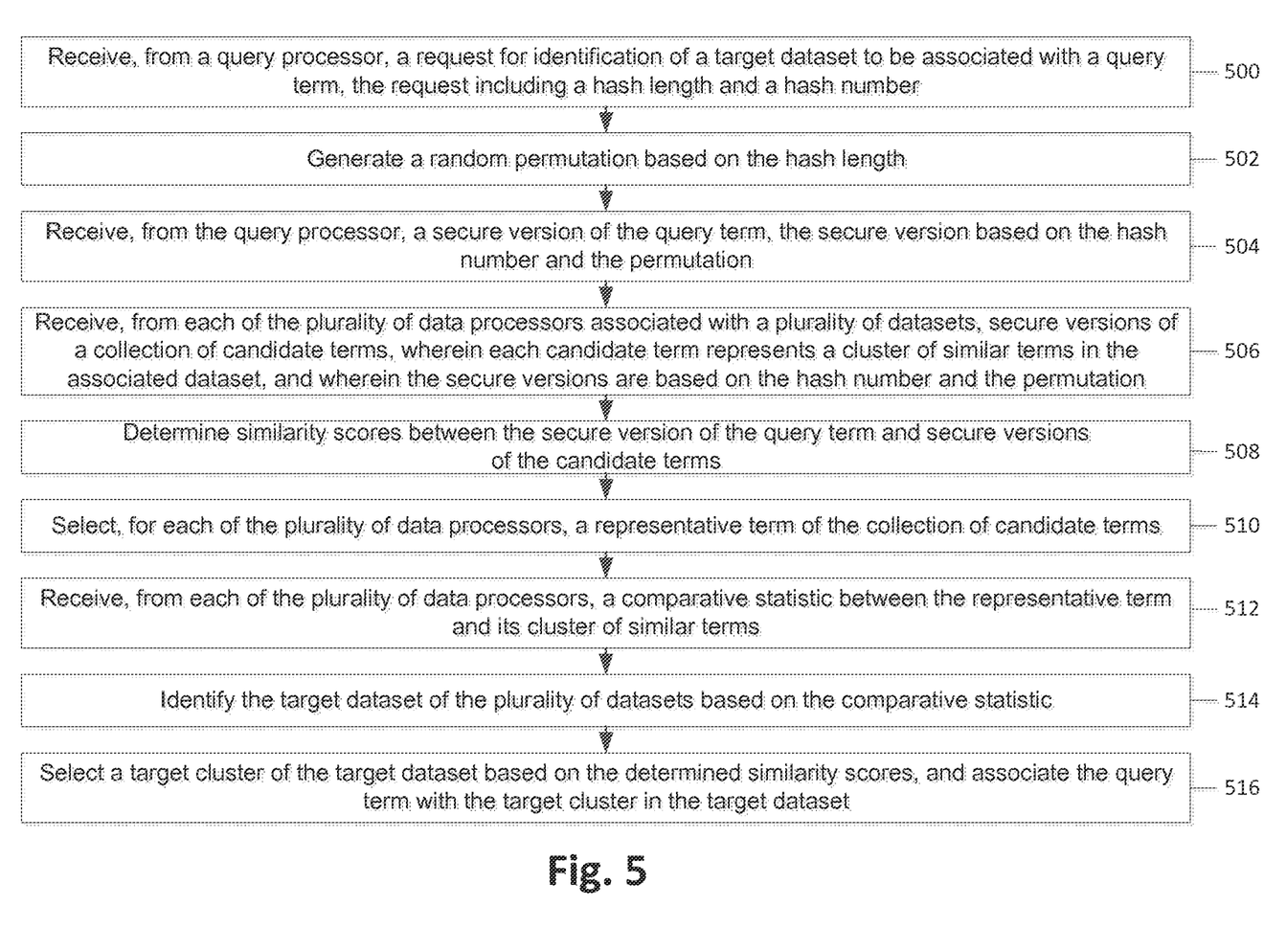
FIG. 5 is a flow diagram illustrating one example of a method for associating a query term with a target cluster in a target dataset in data allocation based on secure information retrieval.

FIG. 5 is a flow diagram illustrating one example of a method for associating a query term with a target cluster in a target dataset in data allocation based on secure information retrieval.

At 500, a request may be received from a query processor, for identification of a target dataset to be associated with a query term, the request including a hash length and a hash number.

At 502, a random permutation may be generated based on the hash length.

At 504, a secure version of the query term may be received from the query processor, the secure version based on the hash number and the permutation.

At 506, secure versions of a collection of candidate terms may be received from each of the plurality of data processors associated with a plurality of datasets, where each candidate term represents a cluster of similar terms in the associated dataset, and where the secure versions are based on the hash number and the permutation.

At 508, similarity scores may be determined between the secure version of the query term and secure versions of the candidate terms.

At 510, a representative term of the collection of candidate terms may be selected for each of the plurality of data processors.

At 512, a comparative statistic between the representative term and its cluster of similar terms may be received from each of the plurality of data processors.

At 514, the target dataset of the plurality of datasets may be identified based on the comparative statistic.

At 516, a target cluster of the target dataset may be selected based on the determined similarity scores, and the query term may be associated with the target cluster in the target dataset.

Figure 6:
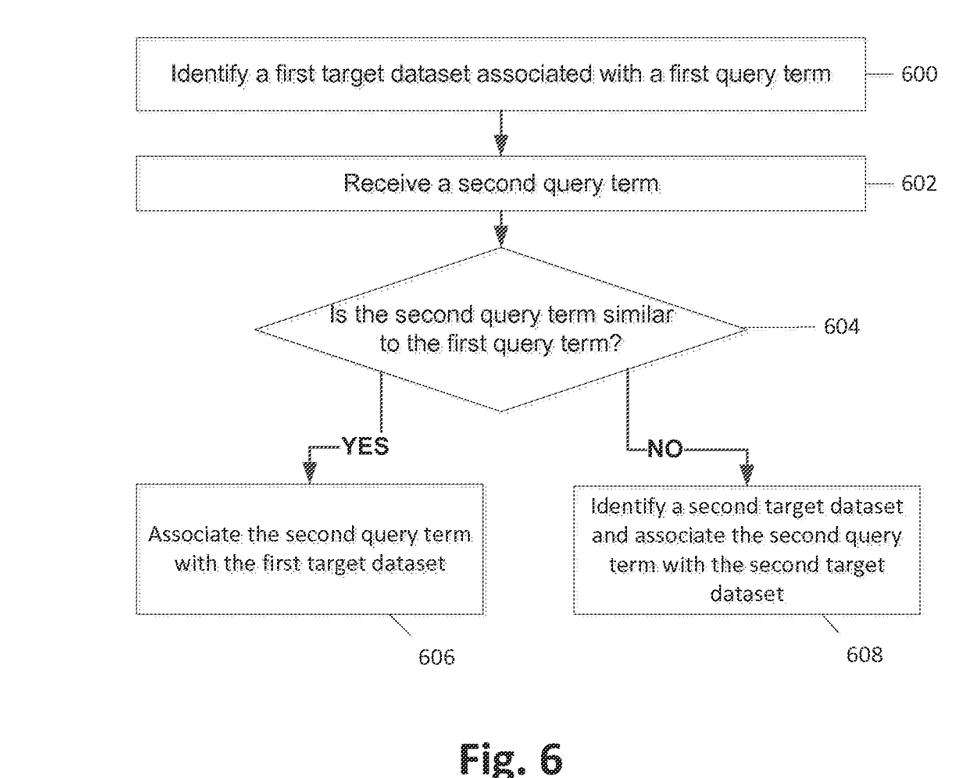
FIG. 6 is a flow diagram illustrating one example of a method for providing a second query term to a target dataset in data allocation based on secure information retrieval.

FIG. 6 is a flow diagram illustrating one example of a method for providing a second query term to a target dataset in data allocation based on secure information retrieval.

At 600, a first target dataset associated with a first query term may be identified.

At 602, a second query term may be received.

At 604, it may be determined if the second query term is similar to the first query term.

At 606, upon a determination that the second query term is similar to the first query term, the second query term may be associated with the first target dataset. In some examples, the second query term may be provided to the first target dataset.

At 608, upon a determination that the second query term is not similar to the first query term, a second target dataset may be identified based on methods described herein, and the second query term may be associated with the second target dataset. In some examples, the second query term may be provided to the second target dataset.

Examples of the disclosure provide a generalized system for data allocation based on secure information retrieval. The generalized system provides a protocol for identifying storage devices with content similar to an incoming data element in a secure and anonymized manner. The present disclosure focusses on identifying an appropriate data storage device prior to storing the incoming data element, while maintaining the anonymity of the data stored in the storage devices and the incoming data element.

Although the examples are described with a query term in a query dataset, the techniques disclosed herein may be applied to more than one query term in the query dataset. Generation of secure terms based on the transformed data terms ensures that the information processor does not have complete data; so information may not be leaked by the information processor. Additionally, the hash transformation ensures that the information processor only has the hashes. Accordingly, the information processor is unable to regenerate the original data terms in the datasets (i.e., hash-to-data is not possible).

Although specific examples have been illustrated and described herein, especially as related to numerical data, the examples illustrate applications to any dataset. Accordingly, there may be a variety of alternate and/or equivalent implementations that may be substituted for the specific examples shown and described without departing from the scope of the present disclosure. This application is intended to cover any adaptations or variations of the specific examples discussed herein.

The invention claimed is:

1. A system for data allocation based on secure information retrieval, the system comprising:
an information processor communicatively linked to a query processor and a plurality of data processors respectively associated with a plurality of datasets, wherein the information processor is to:

receive, from the query processor, a request for identification of a target dataset to be associated with a query term, the request including a hash length and a hash number;

generate a random permutation based on the hash length;

receive, from the query processor, a secure version of the query term, the secure version based on the hash number and the permutation;

receive, from each of a plurality of data processors, secure versions of a collection of candidate terms, wherein each candidate term represents a cluster of similar terms in the associated dataset, and wherein the secure versions are based on the hash number and the permutation;

determine similarity scores between the secure version of the query term and secure versions of the candidate terms; and identify the target dataset of the plurality of datasets based on the determined similarity scores.

2. The system of claim 1, wherein the information processor is to provide the query term to the identified target dataset.

3. The system of claim 1, wherein the information processor is to identify the target dataset by:

select, for each of the plurality of data processors, a representative term of the collection of candidate terms;

provide, to each of the plurality of data processors, the respective representative term;

receive, from each of the plurality of data processors, a comparative statistic between the representative term and its cluster of similar terms; and identify the target dataset based on the comparative statistic.

4. The system of claim 1, wherein the secure terms are based on applying orthogonal transforms to the respective terms.

5. The system of claim 1, wherein the plurality of datasets is a respective plurality of secure storage containers, and the query term is a data term to be stored in a target storage container associated with the target dataset.

6. The system of claim 1, wherein the information processor is to:

rank the plurality of datasets based on the determined similarity scores; and provide, to the query processor, the ranked list of datasets.

7. The system of claim 5, wherein the information processor is to identify the target dataset based on the ranking.

8. The system of claim 1, wherein the information processor is to select a target cluster of the target dataset based on the determined similarity scores, and is to associate the query term with the target cluster in the target dataset.

9. The system of claim 1, wherein the information processor is to:

receive a second query term from the query processor;

determine if the second query term is similar to the query term;

upon a determination that the second query term is similar to the query term, provide the second query term to the identified target dataset; and upon a determination that the second query term is not similar to the query term, identify a second target dataset, and provide the second query term to the identified second target dataset.

10. A method for data allocation based on secure information retrieval, the method comprising:

receiving, from a query processor, a request for identification of a target dataset to be associated with a query term, the request including a hash length and a hash number;

generating a random permutation based on the hash length;

receiving, from the query processor, a secure version of the query term, the secure version based on the hash number and the permutation;

receiving, from each of the plurality of data processors associated with a plurality of datasets, secure versions of a collection of candidate terms, wherein each candidate term represents a cluster of similar terms in the associated dataset, and wherein the secure versions are based on the hash number and the permutation;

determining similarity scores between the secure version of the query term and secure versions of the candidate terms;

selecting, for each of the plurality of data processors, a representative term of the collection of candidate terms;

receiving, from each of the plurality of data processors, a comparative statistic between the representative term and its cluster of similar terms; and identifying the target dataset of the plurality of datasets based on the comparative statistic.

11. The method of claim 10, comprising providing the query term to the identified target dataset.

12. The method of claim 10, comprising selecting a target cluster of the target dataset based on the determined similarity scores, and associating the query term with the target cluster in the target dataset.

13. The method of claim 10, wherein the plurality of datasets is a respective plurality of secure storage containers, and the query term is a data term to be stored in a target storage container associated with the target dataset.

14. A non-transitory computer readable medium comprising executable instructions to:

receive, from a query processor, a request for identification of a target dataset to be associated with a query term, the request including a hash length and a hash number;

generate a random permutation based on the hash length;

receive, from the query processor, a secure version of the query term, the secure version based on the hash number and the permutation;

receive, from each of the plurality of data processors associated with a plurality of datasets, secure versions of a collection of candidate terms, wherein each candidate term represents a cluster of similar terms in the associated dataset, and wherein the secure versions are based on the hash number and the permutation;

determine similarity scores between the secure version of the query term and secure versions of the candidate terms;

identify the target dataset of the plurality of datasets based on the determined similarity scores; and provide the query term to the identified target dataset.

15. The computer readable medium of claim 14, comprising executable instructions to:

select a target cluster of the target dataset based on the determined similarity scores; and associate the query term with the target cluster in the target dataset.

16. The system of claim 1, wherein the information processor is not exposed to an unsecure version of the query term or an unsecure version of the candidate terms.

17. The system of claim 1, wherein the information processor is configured to extract information about the query term and the secure version of the query term prevents the information from being extracted.

18. The system of claim 1, wherein the information processor is further to:
- apply an orthogonal transform to at least one of the candidate terms; and
- determine an index of the hash position based on the orthogonal transform.

19. The system of claim 1, wherein the secure version of the query term allows the information processor to retrieve information about the query term absent revealing an unsecure version of the query term.

20. The system of claim 1, wherein the secure version of the query term and the secure versions of the cluster of similar terms in the associated dataset are a same length, and the determined similarity scores are a ratio of the same length corresponding to a number of shared data elements between the secure version of the query term and one or more similar terms in the cluster.

* * * * *